Nov. 25, 1941.   V. T. WIGLESWORTH   2,263,940
DIRECTION INDICATING MECHANISM
Filed Jan. 28, 1939
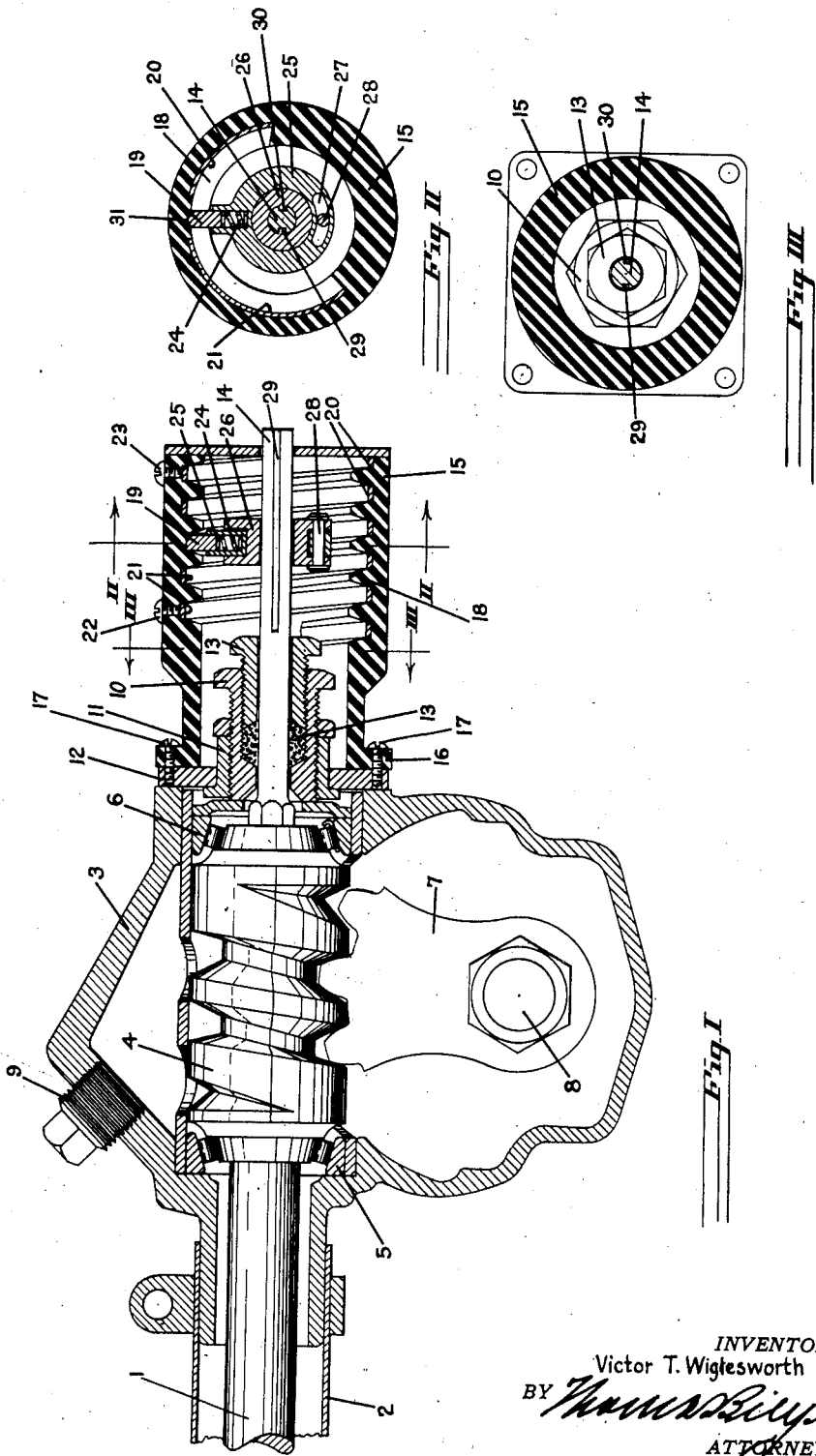
INVENTOR
Victor T. Wiglesworth
BY
ATTORNEY Patented Nov. 25, 1941

2,263,940

UNITED STATES PATENT OFFICE 2,263,940

DIRECTION INDICATING MECHANISM

Victor T. Wiglesworth, Portland, Oreg.

Application January 28, 1939, Serial No. 253,376

6 Claims. (Cl. 200—59)

My invention relates to improvements in direction indicating mechanisms for vehicles.

The purpose of my invention is to provide a direction indicating circuit maker and breaker that is to be placed upon the lower end of the steering column of a motor vehicle to provide automatic means for making and breaking an electric circuit leading to direction indicating lights that are to be illuminated upon the rotation or partial rotation of the steering column through the manipulation of the same by the steering wheel.

The invention is comprised of an insulating housing, fixedly positioned upon the housing for the lower end of the steering column that is of the conventional type and that is normally used for the operation of the sector gear and shaft for steering the front wheels of a motor vehicle.

I provide a leak-proof bearing through which a splined shaft passes that is secured to the lower end of the steering column or to the worm disposed thereupon. A box-like thread is disposed internally of the insulating housing with which a gear segment coacts and as the gear segment is rotated from its normal position in either direction an electric circuit is completed to thereby provide means for energizing a light disposed within the electric circuit to indicate that the steering mechanism indicator is turned and that the driver is turning to either side or that he is straightening the vehicle from a straight line.

The primary purpose of my invention is to provide a suitable automatic means for energizing an electric circuit to indicate that the driver of a vehicle intends to turn to the right or to the left.

A further object of my invention is to provide automatic means at the lower ends of the steering column and one that will be out of view of the driver of the vehicle and one that may not be easily accessible by the driver to permit his getting the same out of adjustment or out of operation.

A still further object of my invention is to provide a device for the purpose intended that will be relatively cheap to make and one that will have a long and useful operation life with practical freedom from operating mechanical annoyances.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. I is a sectional side view of the lower end of the steering column of a motor vehicle to which is attached mechanism for making and breaking an electric circuit leading to the lighting system of a motor vehicle. In this view the circuit breaker is shown in neutral position with the electric circuit broken that leads to the direction indicating lights disposed upon the vehicle.

Fig. II is a sectional end view of the mechanism illustrated in Fig. I. This view was taken on line 2—2 of Fig. I looking in the direction indicated, and in this view the circuit breaker is also shown in neutral position with the circuit broken.

Fig. III is a sectional end view taken on line 3—3 of Fig. I looking in the direction indicated.

Like reference characters refer to like parts throughout the several views.

I have here shown a fragmentary view of the steering column shaft 1 housed within the conventional tube 2. The housing is shown at 3 and the worm 4 disposed within the housing in the usual manner with the shaft having anti-friction bearings 5 and 6 disposed at the oppositely disposed ends of the worm 4.

The automobile steering being accomplished through the use of the sector gear 7 that is disposed within the housing coacts with and is driven by the worm 4 and is mounted upon the sector shaft 8. The housing 3 has a filler plug 9 associated with the top side to facilitate the lubricating of the same.

I provide a hollow tubular adjusting screw 10 and thread the same into the gland bushing 11. The gland bushing 11 is held in place by the collar 12. The male end of the gland nut 13 is threaded into the tubular packing gland 10 and suitable packing material 13 forms a tight connection about the spline extension shaft 14 that is either formed integral with the worm 4 or is threaded or otherwise secured thereto so that as the steering column shaft 1 and the worm 4 are rotated in either direction in the normal steering of the automobile, the extension shaft 14 will also be rotated.

I provide an insulating housing 15. The housing 15 is secured to the housing 3 and to the collar 12 by forming a flange 16 upon the base of the insulating housing 15 and screws or other fastenings 17 are provided that extend through the flange 16 and through the collar 12 into the lower end of the housing 3. An internal box thread 18 is formed within the insulating housing 15. A toothed segment 19 is rotatably mounted upon a spline.

The toothed segment 19 is reciprocably mounted within the housing 15 and a spring 24 is disposed within the housing and normally maintains the toothed segment outwardly extended for maintaining a suitable electric contact between the tooth gear segment and one of the electric terminals. The toothed carrier 26 is moved longitudinally of the splined extension shaft 14. As the tooth 19 is rotated within the box thread 18 of the insulating housing 15.

Electric contact terminals 20 and 21 are disposed at the base of the box-like thread and electric screw terminals 22 and 23 are provided that contact the terminals 20 and 21 that are disposed upon their inner ends. The screw terminals 22 and 23 pass through the wall of the insulating housing 15 to provide terminals upon the exterior of the housing to which may be attached electric conductors that lead to the lamps to be illuminated may be disposed within the circuit. The circuit and the lamps are not here shown.

An elongated slit 27 is disposed within the rim of the collar 25 and a pin 28 passes through the rim of the ring 26 and permits a freedom of movement of the pin 20 within the slot to thereby permit a limited freedom of movement of the pin relative to that of the collar. The purpose of the slit 27 and the pin 28 is to provide a delayed action when the shaft 14 has been moved in one direction thus carrying the collar 26 therewith relative to the movement of the thimble 25 and the gear segment 19 which is disposed within a groove formed upon the exterior of the collar 26 so that when the electric circuit has been completed to the terminals 22 and 23 and the driver of the vehicle straightens the steering wheels and the steering column. The electric circuit leading to the direction indicating lamps, not here shown, will remain a closed circuit until the pin 28 has moved the full distance of the slot 27 disposed within the collar 25. Grooves 29 and 30 are disposed within the opposite sides of the splined shaft 14 and a key of the conventional type may be placed therein. Lugs are disposed upon the collar 26 to prevent the rotation of the collar 26 as the shaft 14 is rotated.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, in combination with the steering column and the housing associated with the base end thereof for motor vehicles, a switch structure comprising an insulating housing removably securable to the base end of the housing for the steering column, a splined extension shaft disposed coaxially with the steering column and the insulating housing, a collar slidable along the splined extension shaft, a thimble partially rotatable relative to the collar, a slot disposed within the thimble, a pin movable within the slot to provide limited freedom of rotation of the thimble relative to that of the collar, a pair of electric terminal sheaths disposed spirally within the insulating housing, with the adjacent ends of the electric terminal sheaths being spaced apart and screw thread actuating means for moving the electric contactors and for completing an electric contact when the steering column is turned in either direction from the position of driving straight ahead.

2. A switch adapted to be associated with the steering column of an automotive vehicle for operation by the steering post thereof and comprising, a tubular insulated housing, means for securing the housing to a fixed support of the automotive vehicle steering assembly, a helical running thread disposed upon the inside of the housing, a pair of electrical conducting strips disposed spirally of the inside of the insulating housing and positioned at the base of the thread and spaced apart at their adjacent ends to form a neutral station, electric terminals disposed upon the outside of the housing and in communication with the electric conducting strip, a stem secured to the steering column post and disposed coaxially with the post and with the insulated housing, a thimble carrying a toothed segment adapted for spiral movement within the spiral thread, a slot disposed within the thimble, a collar slidably disposed upon the stem acting as a journal bearing for the thimble and a pin connection secured to the collar and movable within the slot to permit a limited freedom of movement of the thimble relative to the collar and means effecting rotation of the collar as the stem is rotated.

3. A switch adapted to be associated with the steering column of an automotive vehicle for operation by the steering post thereof and comprising a tubular insulated housing, means for securing the housing to a fixed support of the automotive vehicle steering assembly, a helical running thread disposed upon the inside of the insulating housing, a pair of electrical conducting strips positioned at the base of the thread and spaced apart at their adjacent ends to form a neutral station, electric terminals disposed upon the outside of the housing and in communication with the electric conducting strip, a stem secured to the steering column post and disposed within the insulated housing with the housing, the post, and the stem having a common longitudinal center line, a collar mounted upon the stem slidable therealong with a thimble journalled relative to the collar with a limited freedom of movement effecting driving relationship to the stem as the collar is rotated and a projection from the thimble engaging within the spiral groove and contacting the electrical conducting strip disposed at the base of the thread of the spiral groove, with said projection causing the thimble and the collar to move longitudinally of the stem as the steering post is rotated.

4. A switch adapted to be associated with the steering column of an automotive vehicle for operation by the steering post thereof and comprising a rotatable steering post member having a stem secured to the base end of the post outwardly extending therefrom, and said stem having a common longitudinal center line with that of the post, a tubular insulated housing fixedly secured to a fixed support of the steering assemblage, a helical spiral groove disposed internally of the tubular housing, a pair of electrical conducting strips disposed at the base of a spiral thread and spaced apart at their adjacent ends to form a neutral station, a coacting thimble and collar slidable along the stem, with the thimble having an electric terminal slidable within the helical spiral groove and adapted for contacting one at a time the electrical conducting strips disposed within the spiral groove and means permitting a limited freedom of rotation of the thimble relative to the collar.

5. A switch structure employed in conjunction with the steering mechanism of an automotive vehicle, comprising a hollow insulate housing provided with internal threads and designed for mounting to the gear housing of such steering mechanism, a pair of electric contacts at the base of said threads, said contacts being spaced apart at a region intermediate the ends of the threads, a shaft mounted to the steering post of the steering mechanism and positioned within the insulate housing, a sleeve slidably splined upon the shaft, a ring surrounding the sleeve, a loose connection between ring and sleeve providing for limited relative rotation between the two members, and a contact member projecting from the ring, traveling within the aforesaid threads and contacting said contacts as said shaft is rotated back and forth.

6. A switch structure employed in conjunction with the steering mechanism of an automotive vehicle, comprising a hollow insulate housing provided with internal threads and designed for mounting to the gear housing of such steering mechanism, a pair of electric contacts at the base of said threads, said contacts being spaced apart at a region intermediate the ends of the threads, a shaft mounted to the steering post of the steering mechanism and positioned within the insulate housing, a sleeve slidably splined upon the shaft, a ring surrounding the sleeve, said ring having an arcuate slot, a ring carried by the sleeve extending through said slot, said slot and pin providing for limited relative rotation between sleeve and ring, and a contact member projecting from the ring, traveling within the aforesaid threads and contacting said contacts as said shaft is rotated back and forth.

VICTOR T. WIGLESWORTH.